United States Patent Office 3,445,915

Patented May 27, 1969

3,445,915

METHOD OF PRODUCING FOLDED THERMOPLASTIC STRIPS FOR SLIDING CLASP FASTENERS

Eric Engel Cuckson, Penrith, New South Wales, and Arthur Llewelyn Jones, Glenbrook, New South Wales, Australia, assignors to Scovill Manufacturing Company, Waterbury, Conn., a corporation of Connecticut Filed Oct. 21, 1966, Ser. No. 588,436
Int. Cl. B29d 5/00
U.S. Cl. 29—408 3 Claims

ABSTRACT OF THE DISCLOSURE

A method for producing a strip of interconnected thermoplastic interlocking elements for a sliding clasp fastener, wherein thermoplastic material is continuously extruded from an extrusion nozzle onto a plurality of juxtaposed pairs of spaced yarn threads which are advanced past the extrusion nozzle on a roller, such that transverse elements are cast on the periphery of the roller bonded to each pair of yarn threads, whereafter a continuous backing strip is cut from the thermoplastic material extruded onto the roller and each strip is removed from the roller by drawing up its respective pair of yarn threads. In order to form stringers, each strip is folded along its length to bring the pair of yarn threads into confronting relation at one longitudinal edge of the strip and a mounting tape is introduced within the fold of each strip and secured thereto by stitches passing over the transverse elements and through the mounting tape.

This invention relates to a method of producing synthetic thermoplastic strips ultimately to provide a stringer containing interlocking elements for a sliding clasp fastener.

Several attempts have already been made to produce a row of interlocking elements for a sliding clasp fastener as integral parts of a thermoplastic strip which is firstly formed as a flat strip from which a series of cut-outs along the length of the strip are removed. The resultant strip is of ladder-like structure entirely of synthetic thermoplastic material having continuous longitudinal strands either extending in parallel lines, or in zig-zag fashion, laterally along the length of the strip. Prior to attachment of the strip to a tape it is folded across its width, i.e., along its longitudinal center line, to become U-shaped in end elevation.

Due particularly to the double thickness of the continuous longitudinal strands of thermoplastic material, a degree of stiffness is imparted to the length of the stringer and therefore the resulting fastener. Furthermore, these strips are relatively brittle and susceptible to breakage if pinched.

It is an object of this invention to provide a method of producing thermoplastic strips for the stringers of sliding clasp fasteners, which are substantially free from the above defects.

Another object is to provide each strip with a high degree of flexibility by utilizing yarn threads to interconnect the individual thermoplastic interlocking elements.

It is another object to provide a method which enables a plurality of strips to be produced simultaneously.

A further object is to provide a method to utilize the yarn threads on each strip for the removal of the thermoplastic elements from their casting moulds.

In one general form the invention provides a method of producing a strip of thermoplastic interlocking elements for a sliding clasp fastener, comprising locating two yarn threads in spaced relationship, and forming on and between the yarn threads at spaced intervals a row of transversely extending elements of thermoplastic material having an enlarged central portion. Subsequently, it will be necessary longitudinally to fold the strip along its length to bring the yarn threads confronting each other at one longitudinal edge of the strip and the enlarged portions of the elements in an extending row at the other longitudinal edge of the strip, so that it may be applied to a mounting tape.

The novel method of forming the strips is described in detail hereafter with reference to the apparatus illustrated in the accompanying drawing, in which.

Figure 1:
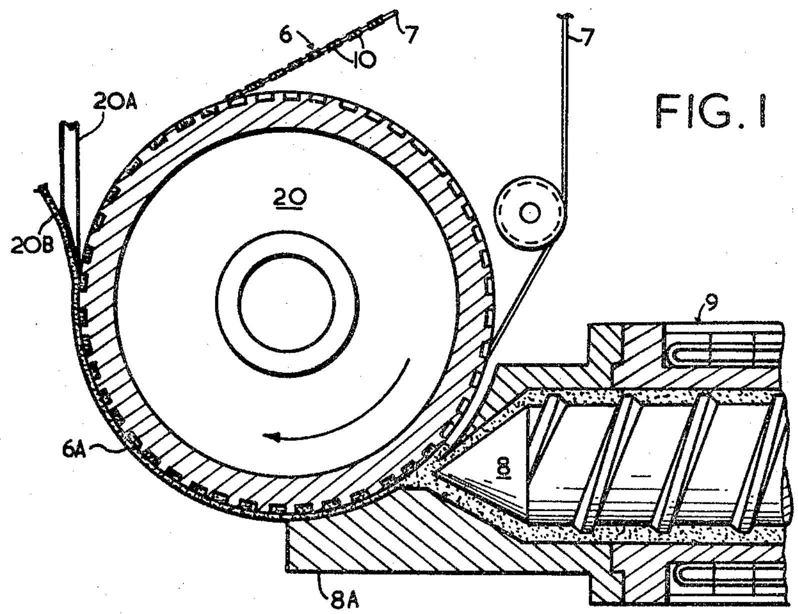
FIGURE 1 is a sectional side view of a thermoplastic extrusion machine, showing the thermoplastic strip of this invention being formed.
Figure 2:
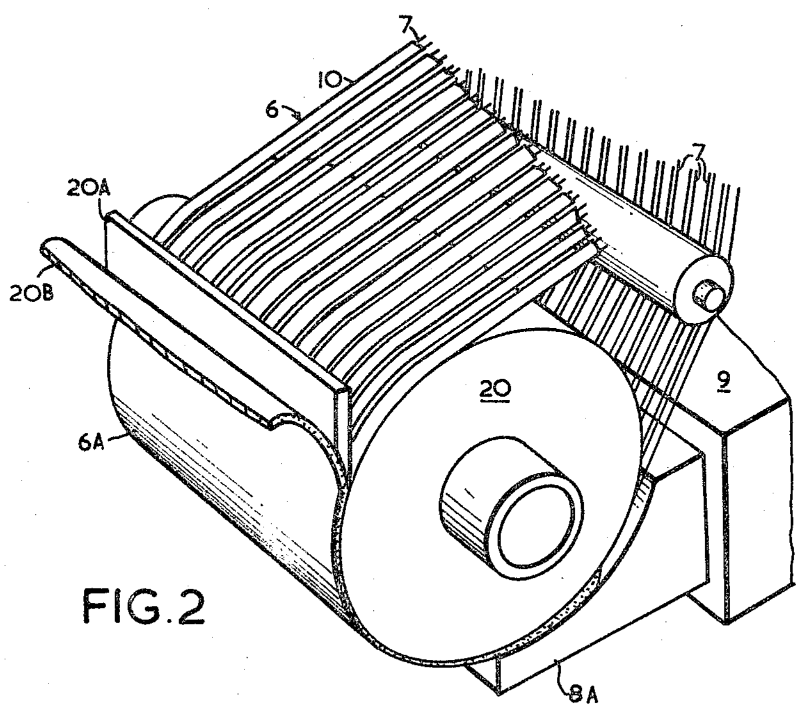
FIGURE 2 is a perspective view of the machine shown in FIGURE 1.

Reference will be made to FIGURES 1 and 2 which show thermoplastic strips 6 being produced by the following method. For each strip 6 a pair of cotton yarn threads 7 are fed in parallel alignment past the extrusion nozzle 8 of a thermoplastic extrusion machine 9. The machine 9 is designed and adjusted to discharge in semi molten state from the nozzle 8 a predetermined amount of thermoplastic material which is delivered to a casting roller 20 around which many pairs of the yarn threads 7 are passed. The profile of the roller 20 coacts with a lip 8A of the nozzle 8 to form a band 6A of material into one face of which is cast many closely spaced strips 6 each having a succession of elongated elements 10 on a respective pair of the yarn threads 7 preferably provided with enlarged ends 11 and an enlarged central portion 12 as shown in FIGURES 3 to 6. The enlarged ends 11 of each element 10 are formed around the cotton yarns 7. Preferably, before complete hardening of the thermoplastic material and before the band 6A has left the roller 20, a layer of the band 6A which forms a continuous backing 20B for the strips 6 is shaved from the band 6A by a knife 20A. After this stage the strips 6 are separate with their elements 10 connected only by their yarn threads 7.

With progression of the yarn threads 7 from the roller 20 a plurality of ladder-like strips 6 are obtained through the attachment of the elements 10 to the yarn threads 7 at uniformly spaced intervals along their lengths. In this way both the bonding of the elements 10 to the yarn threads 7 and the casting of the elements 10 to desired shape are obtained in a single pass. Since at the point of departure of the strips 6 from the roller 20 the thermoplastic material is firmly adhered to the yarn threads 7 they perform the task of withdrawing the elements 10 from the individual moulds in the periphery of the roller 20.

Figure 3:
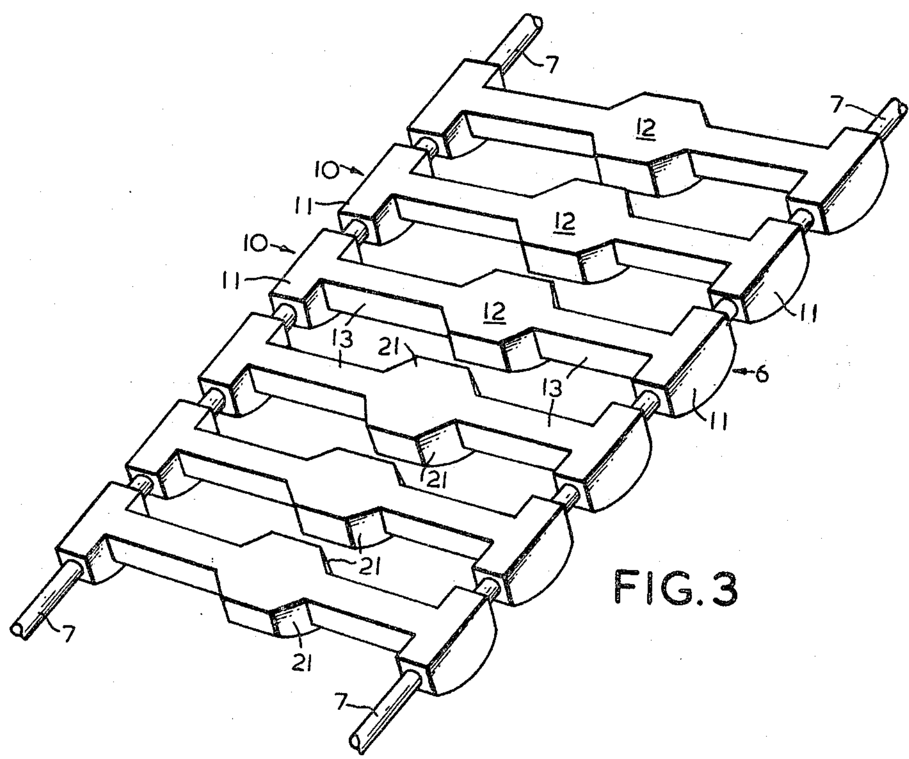
FIGURE 3 is a greatly enlarged fragmentary perspective view of one form of strip formed from the apparatus of FIGURES 1 and 2.
Figure 4:
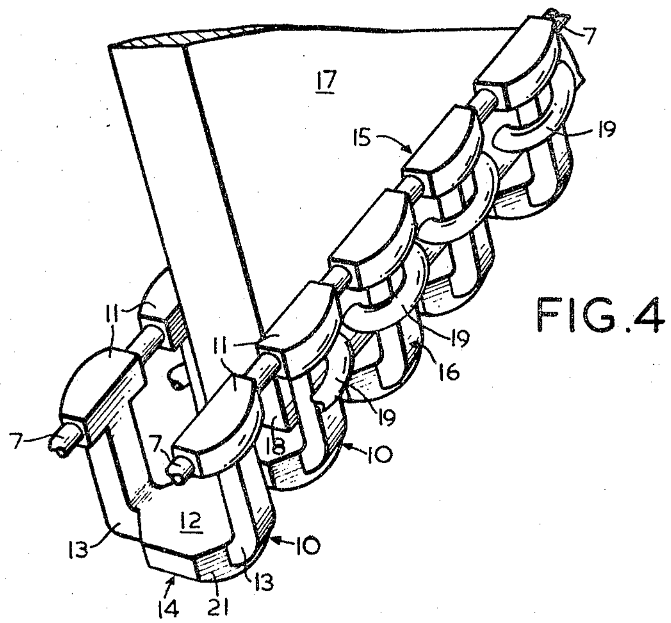
FIGURE 4 is a fragmentary perspective view of the first form of strip bent along its length into U shape and sewn to a tape.
Figure 8:
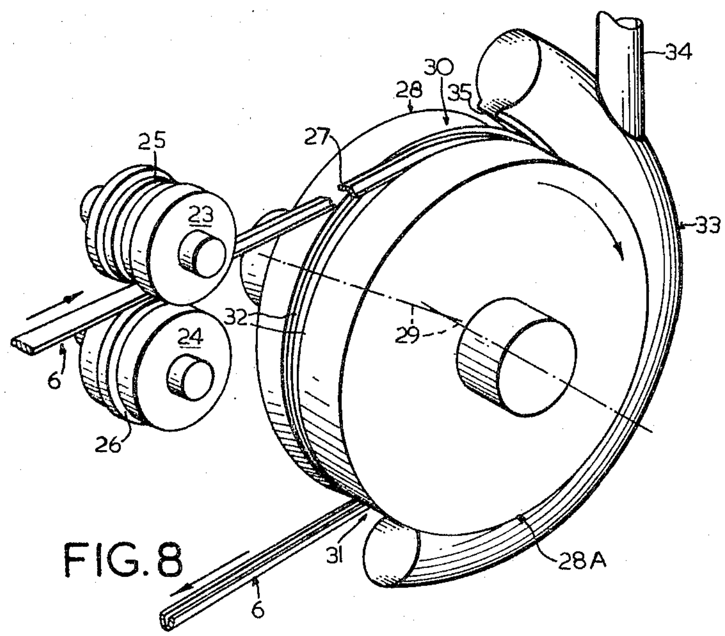
FIGURE 8 shows one form of apparatus to be used in effecting a longitudinal fold in the strips.

One form of construction of the strip 7 to be produced by the above method is shown in FIGURES 3 and 4 where the thickness of the element 10 is reduced at 13 adjacent either side of its enlarged central potrion 12. The ladder-like strip 6 is subsequently folded at either side of its longitudinal centre line as in FIGURE 3, that is along its length, so that each of the bridging elements 10 are bent at their two reduced portions forming stems 13. The result is to produce in the strip 6 a fold which renders it U-shaped in end elevation with the two yarn threads 7 located confronting and adjacent each other on one longitudinal edge 15 of the strip 6 and a projecting row of teeth 14 extending along the opposite longitudinal edge 16 of the strip 6. One form of apparatus which may be used to effect folding of a strip 6 is shown in FIGURE 8 and is described later in this specification.

The thermoplastic strip 6 may then be applied to a tape 17 (see FIG. 4) to form a stringer for a sliding clasp fastener by locating a longitudinal edge portion 18 of the tape 17 within the bight of the U-shaped strip 6 and sewing the strip and tape together as at 19. The best location for the stitches 19 will invariably be about the stem 13 of the elements 10, i.e. between the enlarged end 11 and central portions 12. Therefore, the line of stitching 19 will extend down the length of the folded strip 6. Furthermore, instead of stitching 19 the strip 6 may be attached to its tape 17 by cementing or by a combination of both, or any other suitable means.

It will be seen that with the above construction the teeth 14 forming the interlocking elements of the fastener are linked together solely through interconnecting strands of cotton yarn threads 7, this deriving considerable flexibility and suppleness. Preferably the yarn threads 7 are so located within the enlarged ends 11 of the elements 10 that in the folded condition of the strip 6 they lie close to the confronting faces at the root ends of the U-folded strip 6. In this way greater flexibility is obtained since the yarn threads 7 are located close to the midpoint of the folded strip 6 and therefore to the tape 17. Also, it will be preferred in the casting of the elements 10 to provide the enlarged central potrions 12 thereof with domed outer faces as shown or opposite chamfers (not shown) located on the outer edges confronting the central portions 12 of adjacent elements 10. The ends 11 may be similarly shaped. Due to this provision, the teeth 14 subsequently formed which serve as interlocking elements 10 in the fastener, provide for more efficient engagement and separation of the stringers of a fastener.

Figure 5:
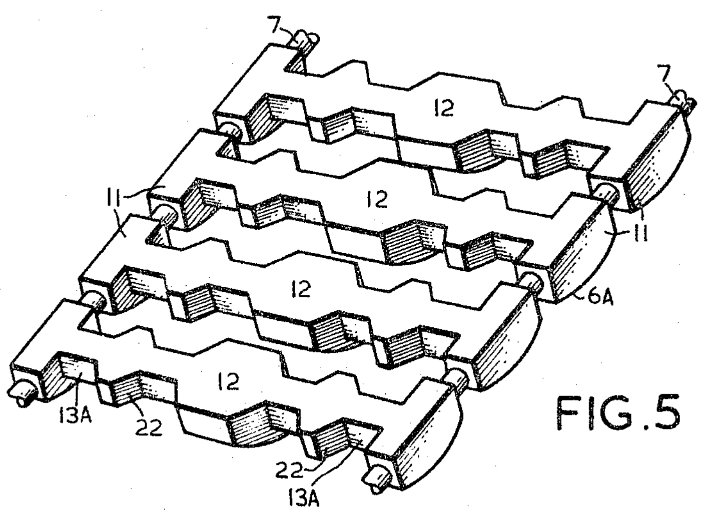
FIGURE 5 is a fragmentary perspective view of a second form of strip which may be produced by the method of the invention.
Figure 6:
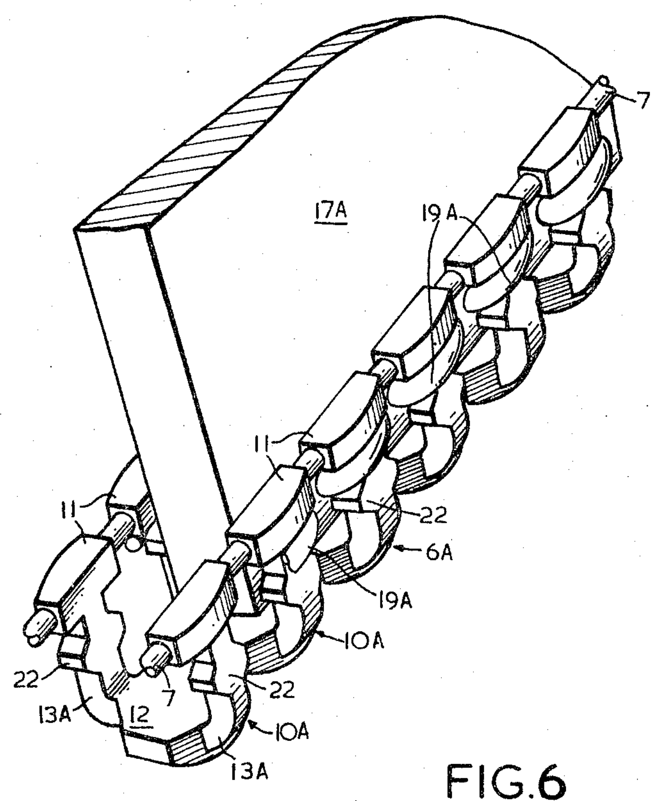
FIGURE 6 is a fragmentary perspective view of the second form of strip bent along its length into U shape and sewn to a tape.
Figure 7:
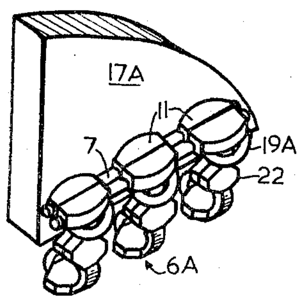
FIGURE 7 is a similar view to FIGURE 6 of the same strip but attached to one side of the tape.

When attachment to tape 17 is effected by stitches 19 formed around the stems 13 of the fastener element 10, as shown in FIGURE 4, it may be desirable to provide additional means to anchor the said elements in position. To this end a second form of strip 6A is provided. This strip is shown in FIGURES 5, 6 and 7. The elements 10A forming this strip 6A are provided with enlarged ends 11 and central potrions 12 as before. Each stem 13A is provided with an additional enlargement 22 intermediate of said enlargement end 11 and central portion 12.

When the strip 6A is bent into U shaped configuration as shown in FIGURE 6, it will be stitched to a tape 17A with the loops of stitching 19A surrounding the stems 13A between the enlarged ends 11 and the adjacent enlargement 22. In this way each element 10A is locked to the tape 17A against longitudinal displacement with respect to the stems 13A. FIGURE 6 shows the edge portion 18 within the bight of the U-shaped strip 6 but alternatively it may be located upon one face of the tape 17 at its longitudinal edge portion 18 as illustrated by FIGURE 7.

The shape of the enlarged ends 11 in both embodiments is preferably as shown in which they are approximately rectangular with their length, i.e., greater dimension, extending longitudinally with the yarn threads 7. The length of the ends 11 should be such as to provide a narrow gap between adjacent ends which is spanned by the yarn 7. These provisions will give the slide to the slide fastener greater bearing surface and better anchorage of the elements 10 to the yarn threads 7. They also, to some extent, prevent breaking open of the fastener by resisting angling of its interlocking elements when the stringers are pinched by folding back upon themselves.

An effective manner of longitudinally folding the strips 6 is shown in FIGURE 8.

A method of bending and forming the flat strip 6 of interconnected fastener elements into U-shaped configuration is illustrated in FIGURE 8 which is a largely diagrammatic perspective view of the essential parts only of the mechanism used to perform this function.

The polymeric material used in the manufacture of the fastener elements being of a thermoplastic nature, can be bent only through a small angle without cracking when at ambient or room temperature. The single strip 6 is therefore fed firstly between a pair of driven forming rolls 23 and 24. The roll 23 is medially grooved at 25 and a raised land 26 on the roller 24 rotates within said groove 25 with a degree of clearance between said land and groove.

This arrangement produces a slight arcuate bow or set in the strip 6 which is shown broken at 27 to illustrate this set. The set formed in the strip 6 by the rollers 23 and 24 is not sufficient to produce cracks in the material.

To bend the strip 6 into its final U shaped configuration, heat must be applied thereto while the strip is gradually bent to the desired degree. To perform this function two relatively large juxtaposed discs 28 are employed. The discs 28 and 28A are mounted with their axes 29 slightly out of line, but are both interdriven by a system of spur gearing (not shown) so that they rotate with a common angular velocity. The arrangement is such that the opposed faces of the discs 28 and 28A are spaced apart to a maximum distance at the position 30. The distance between the discs is at a minimum at the position 31. At the position 30 the space between the discs 28 and 28A is equal to the width of the bent strip 6 as shown at 27.

The bent strip 6 is fed between the discs 28 and 28A at the position 30 where the margins of the said strip engage with circumferential grooves 32 formed on both of said discs 28 and 28A.

An approximately semicircular heating manifold 33 is positioned adjacent the discs 28 and 28A between the positions 30 and 31 and is fed with heated air from a controlled source by a conduit 34. A slot 35 in the manifold 33 directs the hot air onto the strip 6 as it is carried around between the discs, within the grooves 32, which converge as the strip moves from position 30 to the position 31. The heat is thus applied particularly to the center of the strip so that it bends progressively thereat along its center line to emerge from between the discs at the position 31, at which stage it is bent into the desired final form.

What we claim is:

1. A method of producing a strip of interconnected thermoplastic interlocking elements for a sliding clasp fastener, comprising continuously extruding thermoplastic material from an extrusion nozzle, passing a plurality of juxtaposed pairs of spaced yarn threads on a roller past the extrusion nozzle, casting from the thermoplastic material on the periphery of the roller transverse elements bonded to each pair of yarn threads, cutting a continuous backing strip from the thermoplastic material extruded onto the roller, and removing each strip from the roller by drawing up its respective pair of yarn threads.

2. The method claimed in claim 1, including the step of subsequently folding each strip along its length to bring the pair of yarn threads confronting at one longitudinal edge of the strip.

3. A method of producing stringers for a sliding clasp fastener, comprising continuously extruding thermoplastic material from an extrusion nozzle, passing a plurality of juxtaposed pairs of spaced yarn threads on a roller past the extrusion nozzle, casting from the thermoplastic material on the periphery of the roller transverse elements bonded to each pair of yarn threads, cutting a continuous backing strip from the thermoplastic material extruded onto the roller, removing each strip from the roller by drawing up its respective pair of yarn threads, folding each strip along its length to bring the pair of yarn threads confronting at one longitudinal edge of the strip, locating a longitudinal edge of a mounting tape within the fold of each strip, and stitching over the transverse elements and through the mounting tape.

References Cited

UNITED STATES PATENTS

| | | | |
|---|---|---|---|
| 1,877,651 | 9/1932 | Eisenhardt | 264—174 X |
| 2,368,316 | 1/1945 | Meitner. | |
| 2,525,135 | 10/1950 | Huff | 18—21 |
| 2,787,567 | 4/1957 | Fisher | 18—21 X |
| 3,196,196 | 7/1965 | Burbank | 18—21 X |
| 3,320,225 | 5/1967 | Bradbury | 264—295 X |

ROBERT F. WHITE, *Primary Examiner.*

N. RUSHEFSKY, *Assistant Examiner.*

U.S. Cl. X.R.

18—1, 30; 29—528, 529; 264—146, 174, 295